(12) United States Patent
Bunsmann et al.

(10) Patent No.: US 7,559,595 B2
(45) Date of Patent: Jul. 14, 2009

(54) CONVERTIBLE DEVICE FOR A VEHICLE (75) Inventors: Winfried Bunsmann, Bissendorf (DE);
Joachim Maass, Bissendorf (DE);
Heiko Schonhorst, Westerkappeln (DE)

(73) Assignee: Wilhelm Karmann GmbH, Osnabrück (DE)

( * ) Notice: Subject to any disclaimer, the term of this patent is extended or adjusted under 35 U.S.C. 154(b) by 0 days.

(21) Appl. No.: 11/587,602

(22) PCT Filed: Apr. 27, 2005

(86) PCT No.: PCT/DE2005/000781

§ 371 (c)(1),
(2), (4) Date: Aug. 22, 2007

(87) PCT Pub. No.: WO2005/102756

PCT Pub. Date: Nov. 3, 2005

(65) Prior Publication Data
US 2008/0067832 A1 Mar. 20, 2008

(30) Foreign Application Priority Data
Apr. 27, 2004 (DE) .................. 10 2004 020 639

(51) Int. Cl.
B60J 7/00 (2006.01)
(52) U.S. Cl. .............................. 296/107.08; 296/100.17
(58) Field of Classification Search ............ 296/107.08, 296/24.44, 24.43
See application file for complete search history.

(56) References Cited
U.S. PATENT DOCUMENTS
4,969,679 A 11/1990 Eyb 5,225,747 A * 7/1993 Helms et al. ........... 296/107.08
5,654,615 A 8/1997 Brodsky (Continued)

FOREIGN PATENT DOCUMENTS
DE 197 13 606 C1 4/1998

(Continued)

OTHER PUBLICATIONS
Opposition Brief Filed Against DE 10 2004 020 639 B4(+ English translation).

(Continued)

Primary Examiner—Kiran B. Patel
(74) Attorney, Agent, or Firm—Michael Best & Friedrich LLP (57) ABSTRACT

A convertible device of a vehicle comprises a convertible top (10) movable between a closed position and a folded-together, lowered open position and a separating wall (22, 24) separating the convertible top at least in its folded-together open position at least partially from the interior of a luggage space (19) of the vehicle when the convertible device is mounted thereon. At least a portion of the separating wall is formed by a rear shelf part (24) that separates the passenger compartment from the luggage space in the closed position of the convertible top and during movement of the folding top into its open position moves downwardly together with the lower, rear edge portion of the convertible top, so that the folded-together convertible top is disposed above the rear shelf part. A sensor apparatus detects an object located in the luggage space and hindering a lowering of the rear shelf part.

25 Claims, 6 Drawing Sheets

U.S. PATENT DOCUMENTS

| | | | | |
|---|---|---|---|---|
| 5,788,322 | A * | 8/1998 | Wolf et al. | 296/181.4 |
| 6,199,936 | B1 * | 3/2001 | Mac Farland | 296/107.08 |
| 6,390,532 | B1 * | 5/2002 | Mac Farland | 296/107.17 |
| 6,676,191 | B2 * | 1/2004 | Hasselgruber et al. | 296/107.07 |
| 6,886,880 | B2 * | 5/2005 | Heselhaus | 296/107.07 |
| 7,063,371 | B2 * | 6/2006 | Willard | 296/107.17 |
| 7,111,892 | B2 * | 9/2006 | MacNee et al. | 296/107.09 |
| 7,140,666 | B2 * | 11/2006 | Wulf et al. | 296/107.08 |
| 7,284,783 | B2 * | 10/2007 | Mori et al. | 296/107.18 |
| 2001/0026077 | A1 | 10/2001 | Fischer | |
| 2002/0003359 | A1 | 1/2002 | DeGaillard | |
| 2007/0080558 | A1 * | 4/2007 | Heselhaus et al. | 296/107.08 |

FOREIGN PATENT DOCUMENTS

| | | |
|---|---|---|
| DE | 198 27 796 A1 | 1/1999 |
| DE | 101 62 303 A1 | 7/2003 |
| DE | 103 39 274 A1 | 1/2005 |
| EP | 1 136 295 A2 | 9/2001 |
| EP | 1 228 914 A2 | 8/2002 |

OTHER PUBLICATIONS

Decision (Beschluss) of the German Patent Office dated Jun. 1, 2007.
English-language International Search Report for PCT/DE2005/000781.
English-language International Preliminary Report on Patentability for PCT/DE2005/000781.

* cited by examiner

CONVERTIBLE DEVICE FOR A VEHICLE

CROSS-REFERENCE

This application is the US national stage filing of International Application No. PCT/DE2005/000781 filed Apr. 27, 2005, which claims priority to German patent application no. 10 2004 020 639.2 filed Apr. 27, 2004.

TECHNICAL FIELD

The invention concerns a convertible device for a vehicle, which convertible device comprises a convertible top, which is movable between a closed position and a folded-together, lowered opened position, and a separating wall, which separates the convertible top at least in its folded-together opened position at least partially from the interior of the luggage space of the vehicle when the convertible device is mounted on the vehicle.

BACKGROUND ART

A convertible vehicle having an actuation device for an adjustable convertible top compartment floor is known from DE 197 13 606 C1, which floor separates the folded-together convertible top from the luggage space and includes wall elements that are hingedly connected with each other such that the convertible top compartment floor or at least one wall element thereof is adjustable into a lower position and into an upper position. For adjusting the convertible top compartment floor, a handle is attached to a surface of a wall element that faces the luggage space; the handle can be grasped from the open luggage space and enables an adjustment of the convertible top compartment floor from the lower position into the upper position and vice versa. According to the known convertible vehicle, it is thus possible to move a convertible top compartment for accommodating the folded-together, open convertible top into an upper position when the convertible top is closed, so that the luggage space is enlarged. A rear shelf is provided above the convertible top compartment, which rear shelf separates the passenger compartment from the convertible top compartment and/or the rear trunk when the convertible top is closed.

A lowerable convertible top for a convertible vehicle is known from EP 0 356 640 B1, which is accommodated in its folded-together open position in a convertible top compartment that projects into the rear trunk; the convertible top compartment is composed of a floor and upright side walls and consists of elastic, resilient material at least in sections. In the closed position of the convertible top, the convertible top compartment, which is composed e.g. of a rigid floor and accordion-like formed side walls, is pushed together in the upper direction. Due to this capability of being pushed together, the luggage space of the vehicle is only slightly encroached upon when the convertible top is closed. A rear shelf part is provided above the convertible top compartment, which rear shelf part separates the interior space of the vehicle from the convertible top compartment and/or from the rear trunk.

SUMMARY

The object underlying the invention is to provide a convertible top for a convertible vehicle that is movable into a folded-together, lowered open position with a simple design; in this open position, the convertible top is protected from being damaged by objects located in the luggage space and in its closed position, the passenger compartment is separated from the luggage space by a rear shelf.

In a preferred aspect of the present teachings, a convertible device for a vehicle comprises a convertible top, which is movable between a closed position and a folded-together, lowered open position, and a separating wall that, at least in the folded-together open position of the convertible top, separates the convertible top at least partially from the interior of a luggage space of the vehicle when the convertible device is mounted on the vehicle. At least a portion of the separating wall is preferably formed by a rear shelf part that separates the passenger compartment from the luggage space in the closed position of the convertible top. During movement of the folding top into its open position, the rear shelf part moves downwardly together with the lower, rear edge portion of the convertible top, so that the convertible top is disposed above the rear shelf part when the convertible top is stored in the folded-together open position.

According to the invention, a separate convertible top compartment is not required, because the rear shelf, which is lowered together with its rear and lower edge when the convertible top is open, assumes the function at least of the floor of a convertible top compartment cover.

BRIEF DESCRIPTION OF THE DRAWINGS

The invention will be described in the following in an exemplary manner with the assistance of schematic drawings and with further details.

DETAILED DESCRIPTION OF THE INVENTION

In the following, the term front denotes the driving direction of the vehicle, the term rear denotes the rearward direction and the term side denotes the side directions of the vehicle.

Figure 1:
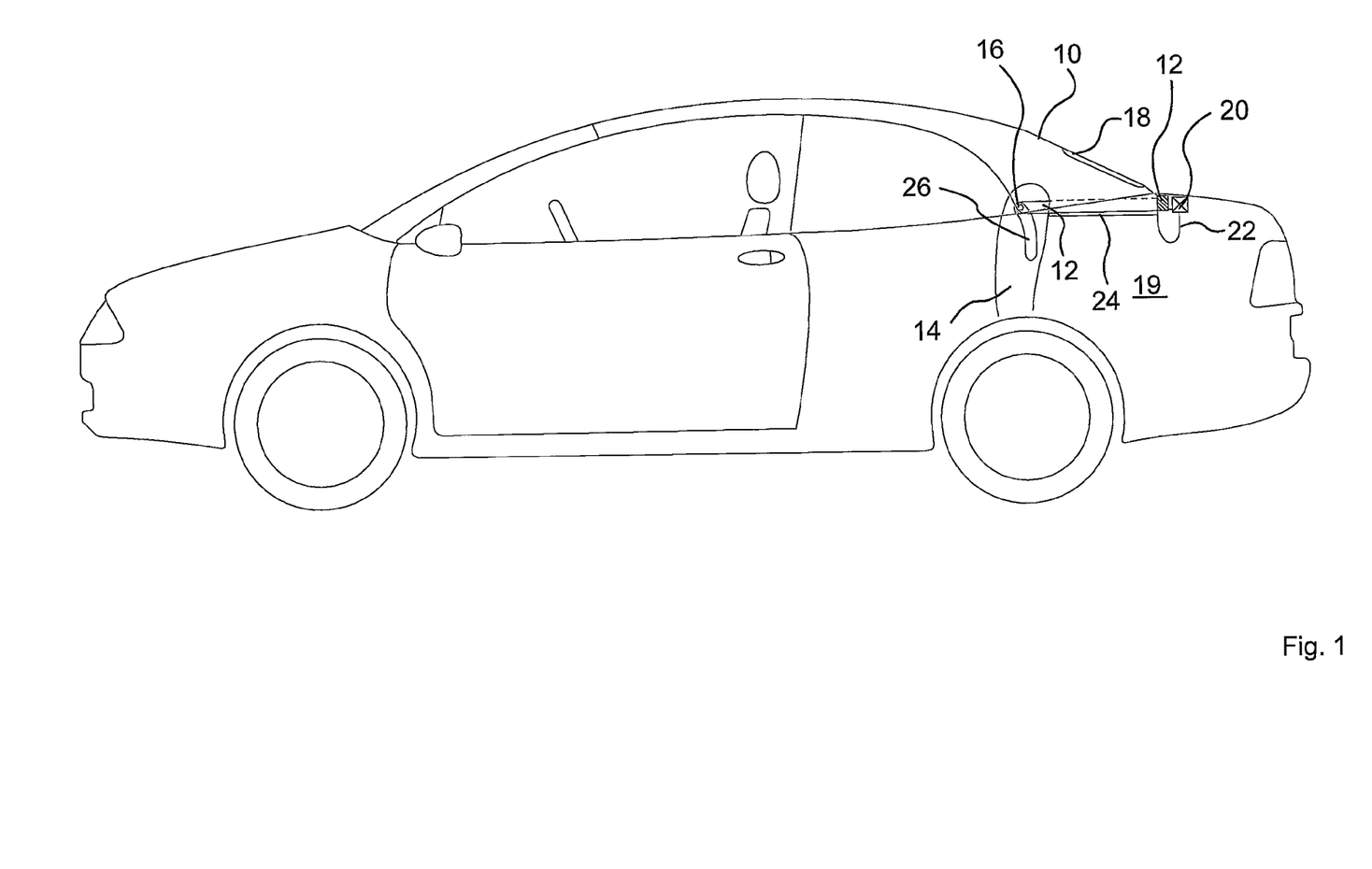
FIG. 1 schematically shows a longitudinal section through a convertible vehicle in the rear portion of the convertible top when the convertible top is closed.

According to FIG. 1, which schematically shows a longitudinal section through a portion of a vehicle, a convertible device comprises a foldable-together or collapsible convertible top denoted as a whole by 10, whose lower, rear edge portion is attached to a convertible top bow 12, which encompasses the rear end of the passenger compartment at the height of the waist line of a vehicle body and is attached to side vehicle body brackets 14, each by means of a hinge 16, so that the convertible top bow 12 is pivotable as a whole about an axis extending in the transverse direction of the vehicle. A rear window contained in the convertible top 10 is denoted by 18. 19 denotes a luggage space located in the rear portion of the vehicle.

The convertible top bow 12 is encompassed by a vehicle body edge 20 that, for example, forms a structural part for reinforcing the rear portion of the vehicle. For example, a rear trunk lid is attached to the vehicle body edge 20 on the right hand side according to FIG. 1; after opening the rear trunk lid, the luggage space 19 is accessible.

For sealing the gap between the convertible top bow 12 and/or the edge of the convertible top 10 and the vehicle body, a collar part 22 made of flexible material is attached to the convertible top bow 12 on one side and to the vehicle body edge 20 on the other side; in the arrangement according to FIG. 1, the collar part 22, e.g., forms a rainwater gutter that is drained via not-illustrated outlets.

The surface surrounded by the convertible top bow 12 is covered by a rear shelf part 24 that is fit in the convertible top bow from above or below and its forward edge is formed such that, e.g., it connects with rear seats (not illustrated) of the vehicle in the state according to FIG. 1. In this way, the interior space of the vehicle is separated from the luggage space by the rear shelf part 24 in the state of FIG. 1 (closed convertible top 10).

A not-illustrated hinge- and roof arch-mechanism for tensioning and folding-together the convertible top 10 is designed at the discretion of the expert in a known manner such that the hinges 16, which are disposed on both sides of the vehicle, are located in the position according to FIG. 1 in the closed state of the convertible top 10, in which position the convertible top bow 12 is disposed substantially horizontally at the level of the vehicle body parapet, so that the lower edge of the convertible top is located substantially at the level of the associated area of the vehicle body outer shell.

When opening the convertible top 10, which can take place mechanically or in a power-assisted manner, the convertible top bow 12 is pivoted in the clockwise direction, wherein the hinge 16 moves downwards in guides 26, which are formed in the vehicle body brackets 14. By lowering the convertible top bow 12, the flexible collar part 22 changes its shape and when the convertible top is fully opened, the flexible collar part 22 forms a separating wall together with the rear shelf part 24, which is lowered together with the convertible top bow 12 (FIG. 3); the separating wall separates the lowered and folded-together convertible top from the interior of the luggage space 19.

When opening the convertible top 10, the described lowering of the convertible top bow 12 can passively follow the convertible top opening, because due to the no longer present tensioning of the convertible top 10, the convertible top bow 12 moves as a whole downwardly until it abuts the end of the guides 26. When closing the convertible top 10, the convertible top bow 12 is lifted, so that the hinge 16 can be advantageously guided in the guide 26 by a pin and moved upwardly up to an upper stopper and the convertible top bow 12 can not further upwardly pivot in the counter-clockwise direction, as illustrated in FIG. 1, due to abutment on a not-illustrated stopper.

With the described construction, the effect of a convertible top compartment is achieved by the rear shelf part 24 and the collar part 22 without the need for separate components and without affecting the volume of the luggage space in the closed state of the convertible top.

Figure 3:
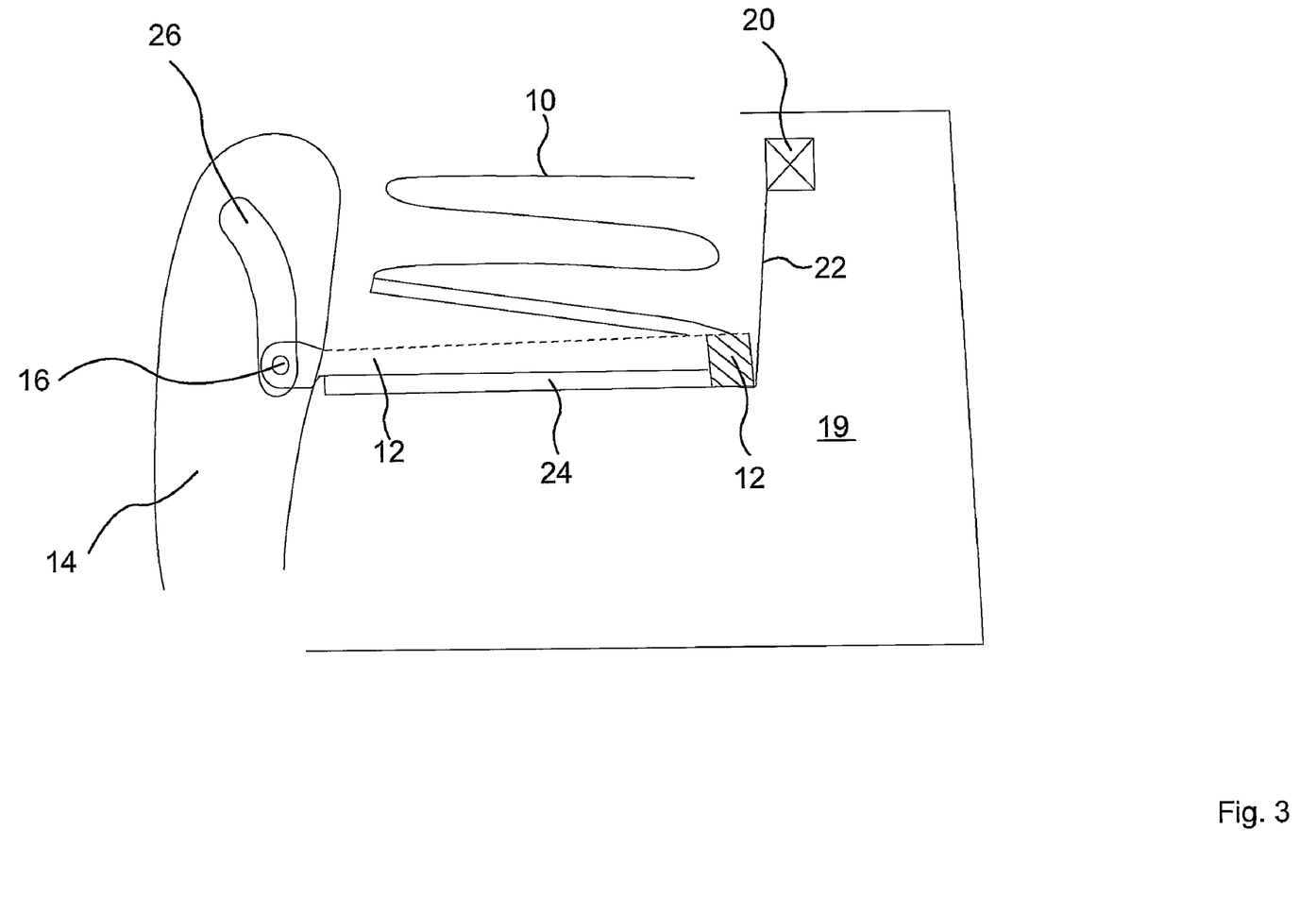
FIG. 3 shows the view of FIG. 1 when the convertible top is fully opened.

It is understood that the described construction can be modified in various ways without departing from the basic concept of the invention to lower the rear shelf part 24 when opening the convertible top, so that it forms a floor for a convertible top receptacle that accommodates the lowered and folded-together convertible top according to FIG. 3. The convertible top can be completely or partially flexible, e.g. made of textile, and/or can be composed of reciprocally-pivotable, intrinsically rigid plate parts.

Figure 4:
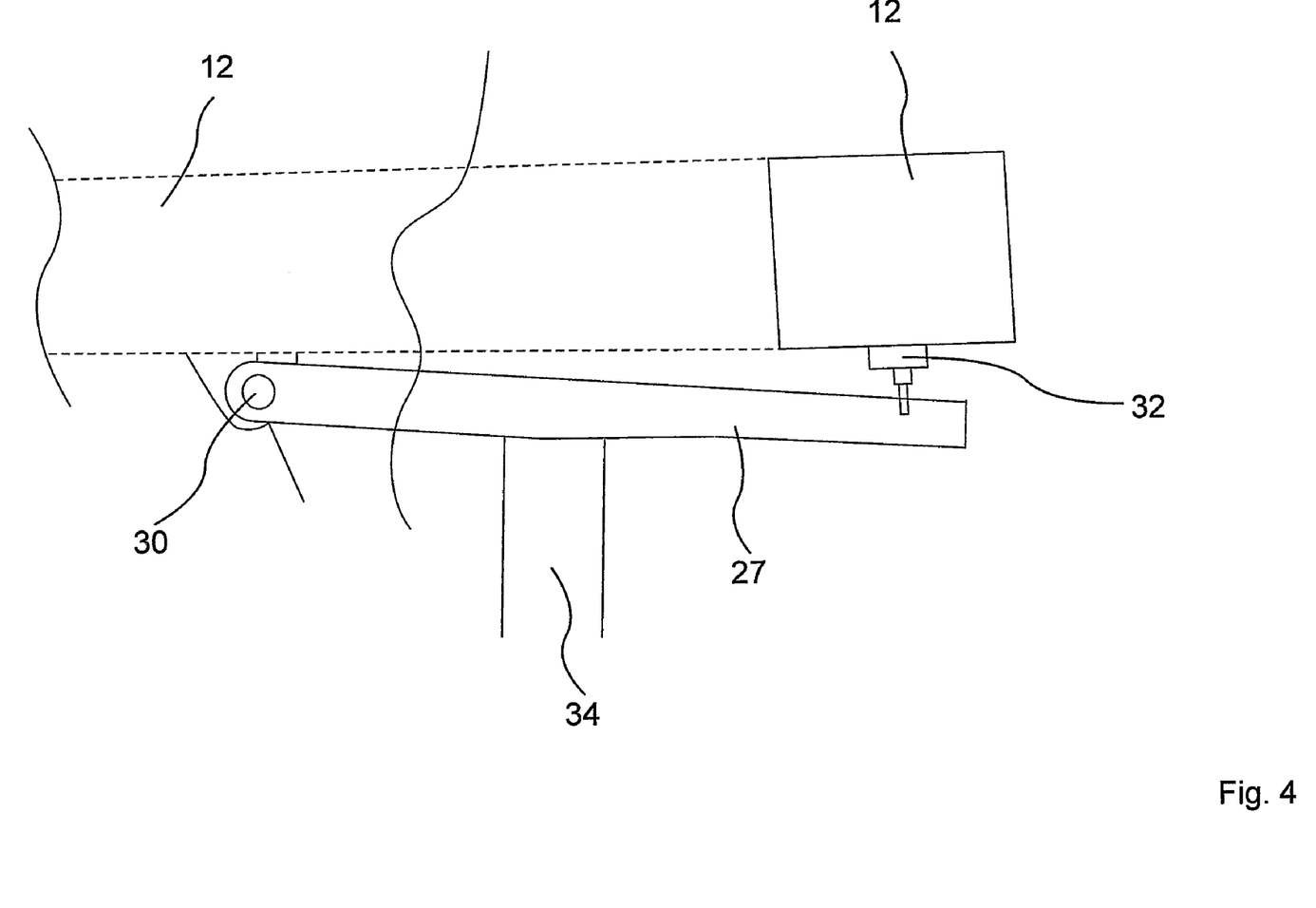
FIG. 4 shows a modification of the embodiment of FIG. 1.

FIG. 4 shows a modified embodiment of the invention in detail. According to FIG. 4, a front portion of a rear shelf plate 27 is pivotably connected with the arm of the convertible top bow 12 by means of hinges 30, wherein torsion springs are advantageously integrated in the hinges 30; the torsion springs bias the rear shelf plate 27 opposite to the clockwise direction. The right portion (according to FIG. 4) of the rear shelf plate 27 abuts a contact switch 32 that is attached to the convertible top bow 12. The normally-existing abutment force is such that the contact switch 32 is not activated. When the rear shelf plate 27 comes into abutment on an object (34) lying in the luggage space during lowering of the convertible top bow 12, an increased force is applied to the contact switch 32, so that it is activated and a warning signal is triggered and/or a power-assisted activation of the convertible top opening mechanism is shut down, so that damage is prevented.

Figure 2:
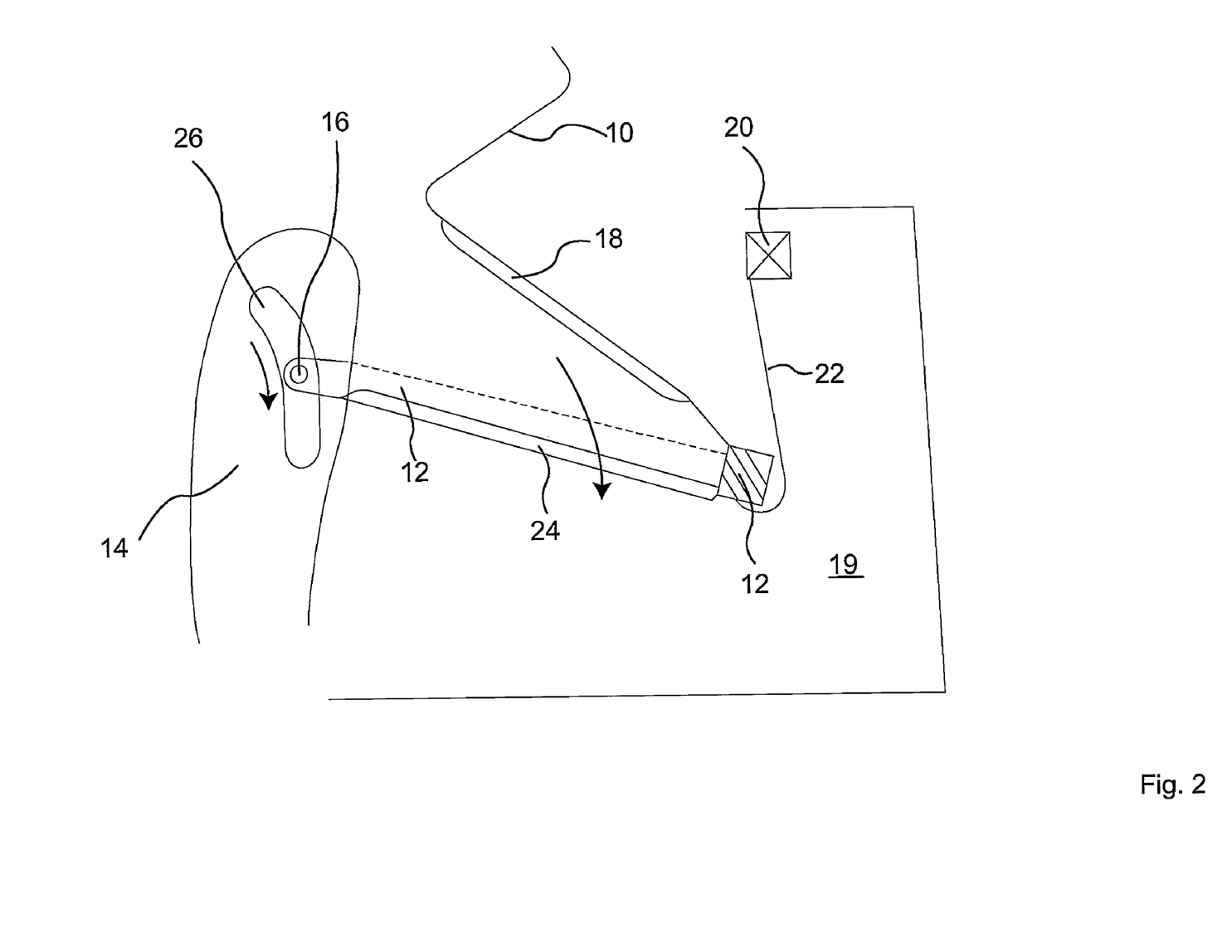
FIG. 2 shows the view of FIG. 1 when the convertible top is partially opened.

The rear shelf plate 27 can assume the function of the rear shelf part 24 of the embodiment according to FIGS. 1 to 3 or can be provided as an additional component to the rear shelf part 24. In the first case, the collar part 22 is attached to the rear shelf plate 27.

The embodiment according to FIG. 4 can be modified in advantageous ways. For example, the lower side of the rear shelf can be designed as a planar foil switch, so that a sensor apparatus for detecting bulky goods is created in this way; the sensor apparatus shuts down, if necessary, a power-assisted activation of a convertible top mechanism and prevents damage.

Figure 5:
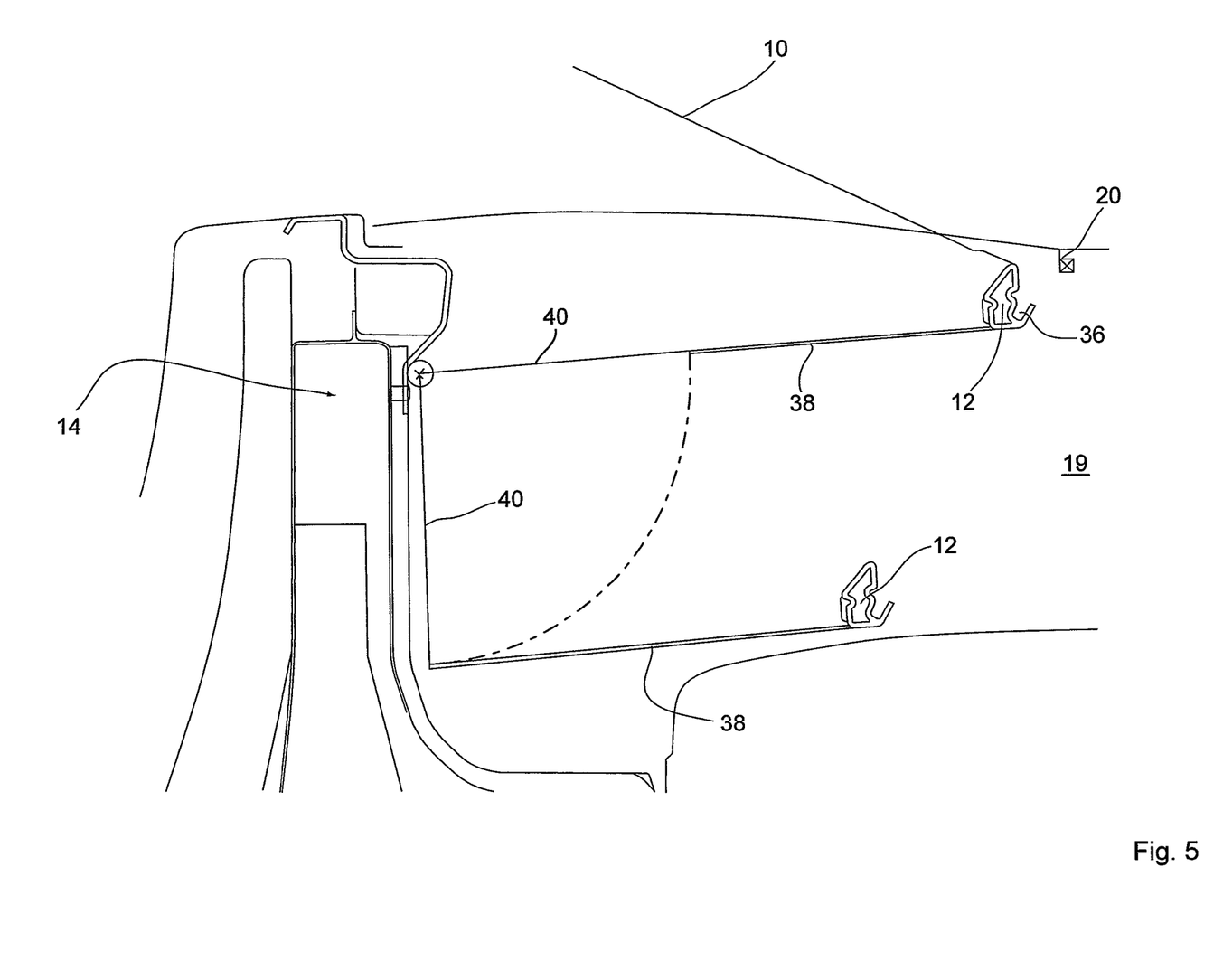
FIG. 5 schematically shows a cross-section through a portion of a convertible vehicle in a further embodiment of the invention and FIG. 6 shows a view similar to FIG. 5 of a modified embodiment.

FIG. 5 shows a further embodiment of the invention, wherein parts that correspond to parts of the preceding Figures are denoted with the same reference numerals.

According to FIG. 5, the convertible top bow 12, which overlaps in a bow- or U-shaped manner the rear end of the vehicle body, which has been cut out in the region of the waist line, is pivotably connected with the side vehicle body brackets 14 in a known manner by means of a not-illustrated multiple-hinge mechanism. A rainwater gutter 36 extends around the rearward edge of the convertible top bow 12 in order to receive water that drains from the convertible top 10 and drains it off to the outside.

Depending upon the reach of the convertible top bow 12, a rear part 38 of a rear shelf is rigidly connected at least with its rear portion; the rear edge of its front part is connected with the front edge of the rear part 38 and/or with a vehicle body cross-beam. The rear part 38 is, e.g., formed by a rigid plate that is connected in a hinged manner with the front part 40, which is likewise formed as a plate; its forward edge is pivotable about an axis that is affixed to the vehicle body and extends transverse to the vehicle longitudinal direction.

As illustrated in FIG. 5, the front part 40 and the rear part 38 form a rear shelf when the convertible top 10 is closed; the rear shelf separates the rear trunk space 19 from the passenger compartment.

In the illustrated example, the kinematics of the movement of the convertible top bow 12 when the convertible top 10 is opened is such that the front edge of the rear part 38 moves along a circular arc line (illustrated with dashed line) with the vehicle-affixed pivot axis of the front part 40 serving as the center point, so that the front part 40 is downwardly pivoted about substantially 90° and its connection with the rear part 38 is bent. The folded-together convertible top 10 in the not-illustrated open position is located over the rear part 38 and behind the front part 40. In order to protect the convertible top against the luggage space that has been narrowed due to the folded-together convertible top, a collar part made of flexible material, similar to the embodiment according to FIG. 1, can be provided between the tensioning- and/or convertible top bow 12.

Figure 6:
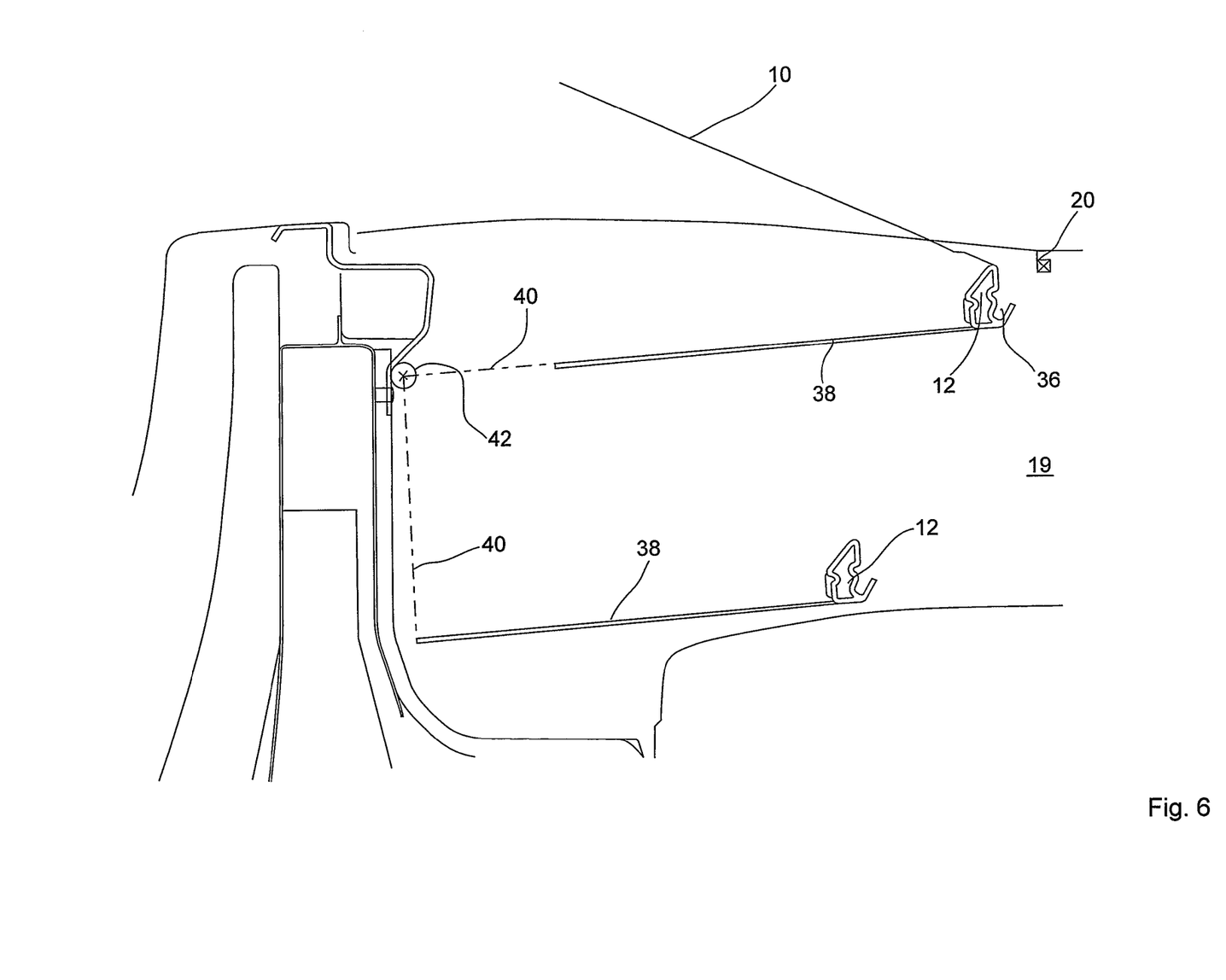

FIG. 6 shows a modified embodiment that differs from FIG. 5 in that the front part 40 is comprised of flexible material, e.g. canvas, and in that the front edge 40 of the front part is windable about a winding shaft 42, so that distance changes between the front edge of the rear part 38 and the axis of the winding shaft 42 during opening and closing of the convertible top are equalized by elastic tensioning of the winding shaft 42 in the winding direction.

The rear part 38 is not required to be designed as an intrinsically rigid plate; it can be formed by canvas that is connected with the convertible top bow 12 along its peripheral edge (with the exception of the front edge). In the embodiment according to FIG. 5, the front part 40 and the rear part 38 can be connected with each other, e.g., by means of a film hinge.

REFERENCE NUMBER LIST

10 Convertible top
12 Convertible top bow
14 Vehicle body bracket
16 Hinge
18 Rear window
19 Luggage space
20 Vehicle body edge
22 Collar part
24 Rear shelf part
26 Guide
27 Rear shelf plate
30 Hinge
32 Contact switch
34 Object
36 Rainwater gutter
38 Rear part
40 Front part
42 Winding shaft

The invention claimed is:

1. A convertible device for a vehicle, comprising:
a convertible top which is movable between a closed position and a folded-together, lowered open position,
a separating wall arranged and constructed to, at least in the folded-together, lowered open position of the convertible top, separate the convertible top at least partially from an interior of a luggage space of the vehicle when the convertible device is mounted on the vehicle,
wherein at least a portion of the separating wall is formed by a rear shelf part that is arranged and constructed to separate a passenger compartment of the vehicle from the luggage space in the closed position of the convertible top and is further arranged and constructed to move downwardly together with a lower, rear edge portion of the convertible top during movement of the convertible top into the folded-together, lowered open position, so that the folded-together, lowered convertible top is disposed above the rear shelf part.

2. A convertible device according to claim 1, wherein the lower, rear edge portion of the convertible top is attached to a convertible top bow that is arranged and constructed to encompass the rear edge of the passenger compartment when the convertible device is mounted on the vehicle and
wherein front ends of the convertible top bow are arranged and constructed to be pivotably connected with the vehicle body and
the rear shelf part is arranged and constructed to cover at least a part of a surface bounded by the convertible top bow.

3. A convertible device according to claim 2, further comprising hinges arranged and constructed to attach the front ends of the convertible top bow to the vehicle body, the hinges being arranged and constructed to downwardly move along the vehicle body when the convertible top is opened.

4. A convertible device according to claim 3, wherein the hinges are movable in guides arranged and constructed to be affixed to the vehicle body.

5. A convertible device according to claim 1, further comprising a flexible wall arranged and constructed to seal a gap between the lower, rear edge of the convertible top and an adjacent edge of the vehicle body when the convertible device is mounted on the vehicle.

6. A convertible device according to claim 2, wherein the rear shelf part includes:
a rear part rigidly connected with at least a rear portion of the convertible top bow, and
a front part disposable between a front end of the rear part and a portion of the vehicle that forms a front, upper end portion of the luggage space when the convertible top is closed,
wherein the convertible top is arranged and constructed to be disposed above the rear part when the convertible top is disposed in the folded-together, lowered open position.

7. A convertible device according to claim 6, wherein the front part of the rear shelf part comprises a flexible material.

8. A convertible device according to claim 7, wherein the front part of the rear shelf part comprises a rollable blind that is windable and unwindable about a winding shaft.

9. A convertible device according to claim 6, wherein the front part of the rear shelf part is formed by a plate pivotably connected with a front edge of the rear part of the rear shelf part and with a frame part that is arranged and constructed to be affixed to the vehicle body.

10. A convertible device according to claim 1, further comprising a sensor apparatus arranged and constructed to detect an object located in the luggage space, which object would hinder lowering of the rear shelf part.

11. A convertible device according to claim 10, wherein the sensor apparatus comprises a contact switch arranged and constructed to be actuated when the lowering of the rear shelf part is hindered by an object located in the luggage space.

12. A convertible device according to claim 11, wherein the contact switch is arranged and constructed to be actuated by a rear shelf plate that is pivotably coupled with a convertible top bow.

13. A convertible vehicle, comprising:
a vehicle body at least partially defining a passenger compartment and a luggage space,
a convertible top mounted on the vehicle body and movable between a closed position and a folded-together, lowered open position, and
a separating wall arranged and constructed to at least partially separate the convertible top from an interior of the luggage space at least when the convertible top is disposed in the folded-together, lowered open position,
wherein at least a portion of the separating wall is formed by a rear shelf part that is arranged and constructed to separate the passenger compartment from the luggage space in the closed position of the convertible top, the rear shelf part being coupled to a lower, rear edge portion of the convertible top so as to move downwardly together with the lower, rear edge portion of the convertible top during movement of the convertible top into the folded-together, lowered open position, such that the folded-together, lowered convertible top is disposed above the rear shelf part.

14. A convertible vehicle according to claim 13, wherein:
the convertible top comprises a convertible top bow arranged and constructed to encompass a rear edge of the passenger compartment,
the lower, rear edge portion of the convertible top is attached to the convertible top bow,
forwardly-directed ends of the convertible top bow are pivotably connected with the vehicle body and
the rear shelf part is arranged and constructed to cover at least a part of a surface bounded by the convertible top bow.

15. A convertible vehicle according to claim 14, further comprising hinges pivotably attaching the front ends of the convertible top bow to the vehicle body, and
guides affixed to the vehicle body, the hinges being arranged and constructed to downwardly move along the guides when the convertible top is moved to the folded-together, lowered open position.

16. A convertible vehicle according to claim 13, further comprising a flexible wall sealing a gap between the lower, rear edge of the convertible top and an adjacent edge of the vehicle body.

17. A convertible vehicle according to claim 14, wherein the rear shelf part includes:
a rear part rigidly connected with at least a rear portion of the convertible top bow, and
a front part disposed between a front end of the rear part and a portion of the vehicle body that forms a front, upper end portion of the luggage space when the convertible top is closed,
wherein the convertible top is arranged and constructed to be disposed above the rear part when the convertible top is disposed in the folded-together, lowered open position.

18. A convertible vehicle according to claim 17, wherein the front part of the rear shelf part comprises a flexible material.

19. A convertible vehicle according to claim 18, further comprising a winding shaft disposed at or near the front, upper end portion of the luggage space, wherein the front part of the rear shelf part comprises a rollable blind that is windable and unwindable about the winding shaft.

20. A convertible vehicle according to claim 17, wherein the front part of the rear shelf part is formed by a plate pivotably connected with a front edge of the rear part of the rear shelf part and with a frame part affixed to the vehicle body.

21. A convertible vehicle according to claim 13, further comprising a sensor apparatus arranged and constructed to detect an object located in the luggage space, which object would hinder lowering of the rear shelf part.

22. A convertible vehicle according to claim 21, wherein the sensor apparatus comprises a contact switch arranged and constructed to be actuated when the lowering of the rear shelf part is hindered by an object located in the luggage space.

23. A convertible vehicle according to claim 22, wherein the contact switch is arranged and constructed to be actuated by a rear shelf plate that is pivotably coupled with a convertible top bow.

24. A convertible vehicle, comprising:
a vehicle body defining at least a passenger compartment and a luggage space rearward of the passenger compartment,
a convertible top movable between a closed position and a folded-together, lowered open position relative to the vehicle body,
first and second substantially-vertically oriented guides coupled to or defined in opposing lateral sides of the vehicle body,
a convertible top bow having first and second front ends and being arranged and constructed to substantially encompass a rear edge of the passenger compartment, wherein a lower, rear edge portion of the convertible top is attached to the convertible top bow,
first and second hinges attaching the respective first and second front ends of the convertible top bow to the vehicle body, the first and second hinges being substantially-vertically moveable in the respective first and second guides when the convertible top is opened and closed, and
a separating wall arranged and constructed to separate the convertible top at least partially from an interior of the luggage space in the folded-together, lowered open position of the convertible top and to separate the passenger compartment from the luggage space in the closed position of the convertible top, the separating wall being at least partially formed by a rear shelf part that covers at least a portion of a surface defined within the convertable top bow,
wherein the rear shelf part is arranged and constructed move downwardly together with the lower, rear edge portion of the convertible top during movement of the convertible top into the folded-together, lowered open position, in which position the folded-together, lowered convertible top is disposed above the rear shelf part.

25. A convertible vehicle according to claim 24, further comprising a flexible wall sealing a gap between the lower, rear edge of the convertible top and an adjacent edge of the vehicle body.

* * * * *